US009204398B2

(12) United States Patent
Haikonen et al.

(10) Patent No.: US 9,204,398 B2
(45) Date of Patent: Dec. 1, 2015

(54) METHOD AND APPARATUS FOR BATTERY WITH SECURE ELEMENT (75) Inventors: Mikko Sakari Haikonen, Espoo (FI); Jari-Jukka Harald Kaaja, Jarvenpaa (FI); Jan-Erik Ekberg, Vanda (FI); Jarmo Tapani Arponen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 514 days.

(21) Appl. No.: 13/052,992

(22) Filed: Mar. 21, 2011

(65) Prior Publication Data

US 2012/0244805 A1 Sep. 27, 2012

(51) Int. Cl.
*H04B 7/00* (2006.01)
*H04W 52/02* (2009.01)
*G06Q 10/00* (2012.01)

(52) U.S. Cl.
CPC ........... *H04W 52/0274* (2013.01); *G06Q 10/00* (2013.01)

(58) Field of Classification Search
CPC .............. H04B 7/00; H04B 3/00; H04B 5/00; H04W 52/02; H04M 1/00; H02J 7/00
USPC ........... 455/41.1, 41.2, 41.3, 552.1, 558, 572, 455/425; 370/255, 329, 341, 338; 340/636.1; 705/16, 17; 902/26
See application file for complete search history.

(56) References Cited

U.S. PATENT DOCUMENTS

| | | | |
|---|---|---|---|
| 7,494,067 B1 | 2/2009 | Zhu | 235/492 |
| 7,693,549 B2 * | 4/2010 | Gallagher | 455/558 |
| 7,694,331 B2 | 4/2010 | Vesikivi et al. | 726/9 |
| 8,061,625 B2 * | 11/2011 | Yu et al. | 235/492 |
| 8,295,769 B2 * | 10/2012 | Bloebaum | 455/41.3 |
| 8,358,596 B2 * | 1/2013 | Byrne et al. | 370/255 |
| 2007/0188144 A1 * | 8/2007 | Hara et al. | 320/132 |
| 2008/0207124 A1 | 8/2008 | Raisanen et al. | 455/41 |
| 2008/0237355 A1 | 10/2008 | Ahn et al. | 235/492 |
| 2009/0023476 A1 | 1/2009 | Saarisalo et al. | 455/561 |
| 2009/0150704 A1 | 6/2009 | Van Bosch | 713/340 |
| 2009/0303138 A1 | 12/2009 | Lin et al. | 343/702 |
| 2010/0048255 A1 | 2/2010 | Jojivet et al. | 455/573 |

(Continued)

FOREIGN PATENT DOCUMENTS

EP 1 534 022 A1 5/2005
EP 1 775 653 A2 4/2007

(Continued)

OTHER PUBLICATIONS

Wenzel et al, "EE Times—Car Key Takes on Role as Payment System", (Aug. 2010), (3 pages).

(Continued)

*Primary Examiner* — Edward Urban
*Assistant Examiner* — Ralph H Justus
(74) *Attorney, Agent, or Firm* — Harrington & Smith (57) ABSTRACT In accordance with an example embodiment of the present invention, mobile device comprises a battery, a short-range wireless communication (SRW) chip set, a secure element incorporated into the battery, and a bootloader, wherein the SRW chip set is configured to sense proximity to a point of sales terminal and, in response, initiate bootup of the mobile device, and wherein the bootloader is configured to determine that bootup was initiated by the SRW chip set and, in response, power up only the SRW chip set and the secure element.

21 Claims, 11 Drawing Sheets

(56) References Cited

U.S. PATENT DOCUMENTS

| | | | |
|---|---|---|---|
| 2010/0050271 A1 | 2/2010 | Saarisalo | 726/28 |
| 2010/0148928 A1* | 6/2010 | Yeager et al. | 340/10.1 |
| 2010/0197224 A1 | 8/2010 | Lahdenniemi et al. | 455/41.1 |
| 2010/0207735 A1 | 8/2010 | Kim | 340/10.1 |
| 2010/0248710 A1* | 9/2010 | Sklovsky et al. | 455/420 |
| 2010/0318712 A1 | 12/2010 | Boldyrev et al. | 710/308 |
| 2011/0022482 A1 | 1/2011 | Florek et al. | 705/16 |
| 2011/0050164 A1* | 3/2011 | Partovi et al. | 320/108 |
| 2011/0055351 A1 | 3/2011 | Boldyrev et al. | 709/219 |
| 2011/0119486 A1 | 5/2011 | Boldyrev et al. | 713/156 |
| 2011/0187511 A1 | 8/2011 | Boldyrev et al. | 340/10.51 |
| 2011/0291834 A1 | 12/2011 | Boldyrev et al. | 340/572.1 |
| 2012/0196529 A1* | 8/2012 | Huomo et al. | 455/41.1 |
| 2012/0238206 A1* | 9/2012 | Singh et al. | 455/41.1 |
| 2013/0137367 A1* | 5/2013 | Fisher | 455/41.1 |

FOREIGN PATENT DOCUMENTS

| | | |
|---|---|---|
| KR | 20080100717 A | 11/2008 |
| WO | WO 2007/076456 A2 | 7/2007 |
| WO | WO 2009/020264 A1 | 2/2009 |

OTHER PUBLICATIONS

"GlobalPlatform_NFC_Mobile_White_Paper", Global Platform's Proposition for NFC Mobile: Secure Element Management and Messaging, (Apr. 2009), (35 pages). www.globalplatform.org.

NC72263, U.S. Appl. No. 12/824,111, filed Jun. 25, 2010.

Logomotion, http://www.logomotion.eu/en/innovative-logomotion-tchnology/secure , (2009), (1 page).

Giesecke & Devrient, http://www.gi-de.com/en/index.jsp, (2011), (1 page).

Steinmeier, "NFC Market Update and Technology Overview", Global Business Development Manager NFC, (2008), (10 pages).

* cited by examiner

METHOD AND APPARATUS FOR BATTERY WITH SECURE ELEMENT

TECHNICAL FIELD

The present application relates generally to short-range wireless communication, power management, and secure elements.

BACKGROUND

Traditionally, payment and/or ticketing applications have been residing on a secure element embedded onto a credit card sized plastic smart card. More recently, secure elements containing payment instructions and/or public transportation tickets have been incorporated into mobile devices, such as mobile phones.

Near field communication can cover various short-range techniques and technologies which enable wireless communication between devices when they are touched together or brought close together. This includes contactless close-to-touch connectivity technologies which involve electromagnetic and/or electrostatic coupling. Examples include Radio Frequency Identification (RFID) technology as well as Near Field Communication (NFC) technology specified by various standardization bodies such as NFC Forum, International Organization for Standards (ISO) and ECMA Internation to name a few. Radio Frequency memory tags (RF tags) and RF tag systems can also be used for short-range wireless communication between devices. In general, an RF tag system can comprise mobile readers/writers (mobile devices) and RF memory tags. Ultralow power, fast RF and high capacity nonvolatile memory has also been proposed for short-range wireless communications.

Combining a secure element and short-range wireless capability in a mobile device can effectively make the mobile device a wireless smart card capable of performing EMVco defined EMV payments and/or acting as a transport ticket.

SUMMARY

Various aspects of examples of the invention are set out in the claims.

According to a first aspect of the present invention, a mobile device comprises a battery, a short-range wireless chip set, a secure element incorporated into the battery, and a bootloader, wherein the short-range wireless chip set is configured to sense proximity to a point of sales terminal and, in response, initiate bootup of the mobile device, and wherein the bootloader is configured to determine that bootup was initiated by the short-range wireless chip set and, in response, power up only the short-range wireless chip set and the secure element.

According to a second aspect of the present invention, a method comprises sensing proximity to a point of sales terminal, initiating bootup of a mobile device in response to sensing proximity to the point of sales terminal, and powering up only Trusted Execution Environment (TrEE) elements in the mobile device.

According to a third aspect of the present invention, a method comprises monitoring reserve battery power and disabling power to the mobile device and only providing power to the TrEE elements when the reserve battery power drops below a minimum threshold.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 11 of the drawings.

Figure 1:
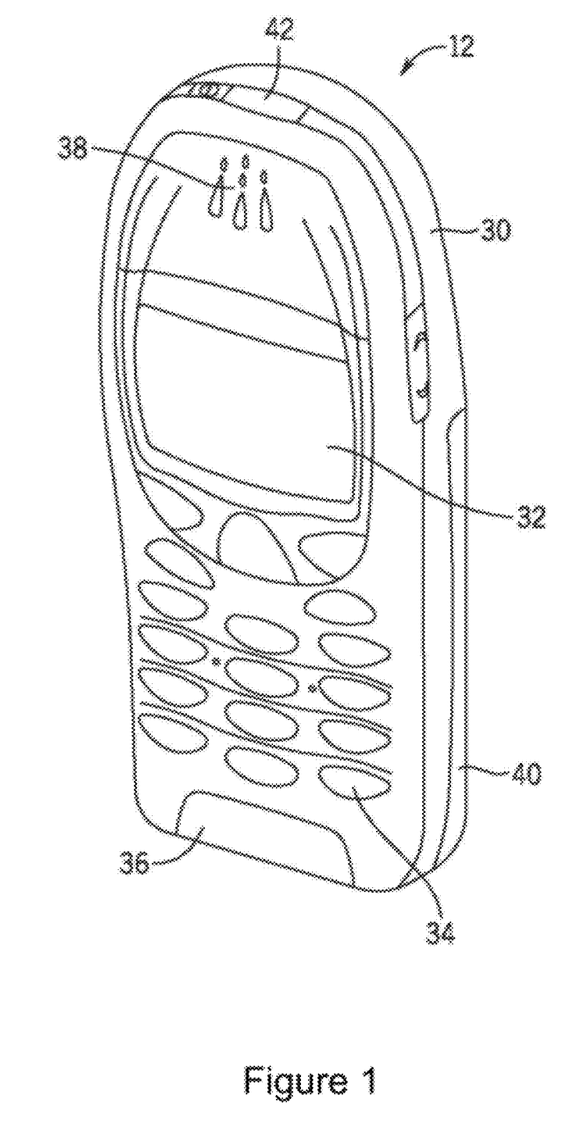
FIG. 1 is an illustration of an electronic device that can be used to implement various aspects of one embodiment of the invention.
Figure 2:
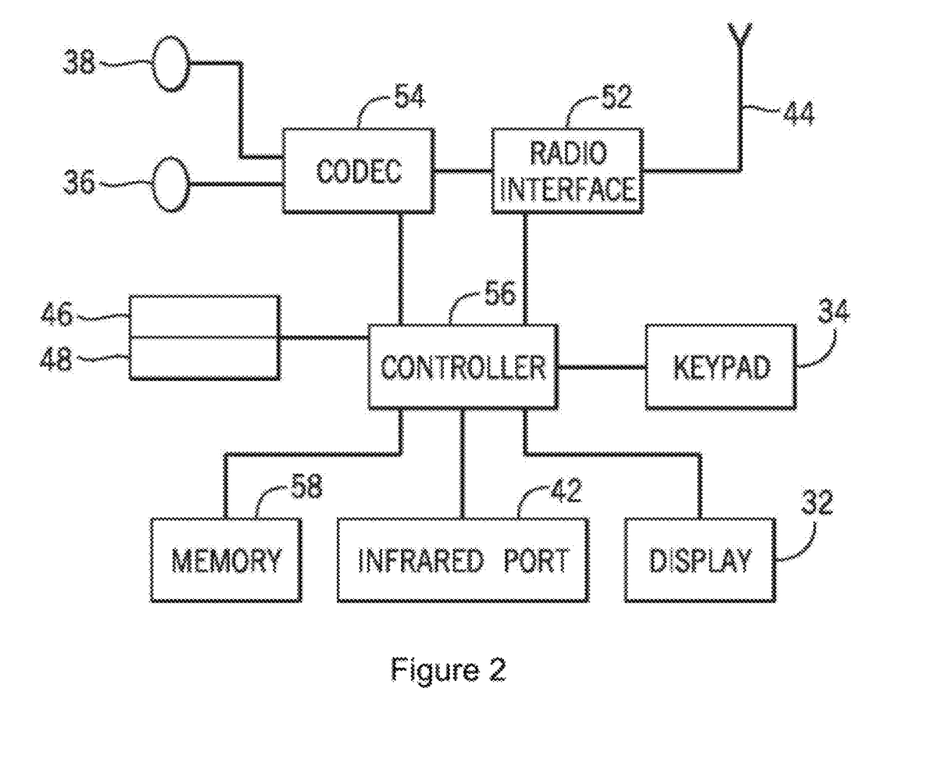
FIG. 2 is a block diagram of an electronic device that can be used to implement various aspects of one embodiment of the invention.

Turning now to the drawings, FIGS. 1 and 2 show one representative mobile device or UE 12 within which various embodiments may be implemented and/or used in conjunction with the implementation of various embodiments. It should be understood, however, that the various embodiments are not necessarily intended to be limited to one particular type of device. The electronic device or User Equipment (UE) 12 of FIGS. 1 and 2 includes a housing 30, a display 32 in the form of a liquid crystal display, a keypad 34, a microphone 36, an ear-piece 38, a battery 40, an infrared port 42, an antenna 44 (or multiple antennas), a smart card 46 in the form of a UICC according to one embodiment, a card reader 48, radio interface circuitry 52, codec circuitry 54, a controller 56 and a memory 58. Individual circuits and elements are all of a type well known in the art. Additional elements, such as a short-range wireless ("SRW") chip set, SRW antenna, RF memory tag system, Secure Element ("SE"), etc. can be added to the UE for implementing various aspects of the invention. In addition, the RF memory tag system may contain both an RF part and a memory part. The RF part could include both power and data radios. In this arrangement, the power radio could utilize the SRW antenna and power the other end with the SRW chip set and the data radio could be used to transfer data between a reader/writer and the tag memory.

Various different network technologies have been implemented for providing wireless connectivity for a mobile device. Some examples include global system for mobile communications (GSM)/general packet radio system (GPRS), wideband code division multiple access (WCDMA), high speed packet data (HSPA), worldwide interoperability for microwave access (WiMAX), and wireless local area network (WLAN).

Figure 3:
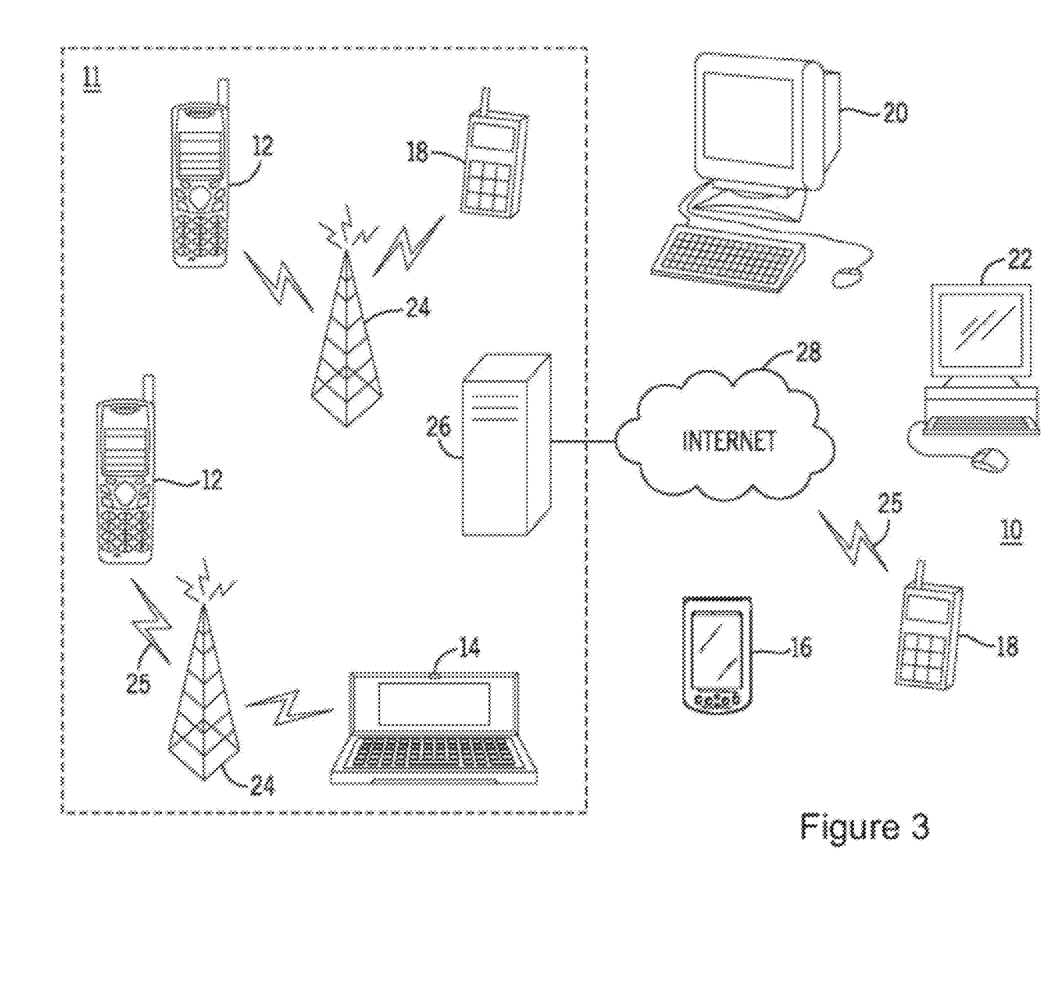
FIG. 3 is a diagram of a system that can be used to implement various aspects of one embodiment of the invention.

FIG. 3 shows a system 10 in which various embodiments can be utilized, comprising multiple communication devices that can communicate through one or more networks. The system 10 may comprise any combination of wired or wireless networks including, but not limited to, a mobile telephone network (e.g., Global System for Mobile Communications (GSM), Wideband Code Division Multiple Access (W-CDMA), Code Division Multiple Access (CDMA), Long Term Evolution (LTE), Ultra Mobile Broadband (UMB), High Rate Packet Data (HRPD), and Worldwide Interoperability for Microwave Access (WiMax)), a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 3 includes a mobile network 11 and the Internet 28. Connectivity to the Internet 28 may include, but is not limited to, long range wireless connections, cellular mobile network connections, short range wireless connections, and various wired connections including, but not limited to, xDSL-lines, Ethernet, telephone lines, cable lines, power lines, and the like.

The exemplary mobile devices or UEs of the system 10 may include, but are not limited to, an electronic device 12, a combination personal digital assistant (PDA) and mobile telephone 14, a PDA 16, an integrated messaging device (IMD) 18, a smart phone, a communicator, etc. The mobile devices may also be wearable by a person, such as clothing, sports or adventure equipment. Some or all of the mobile devices may send and receive calls and messages and communicate with service providers through a wireless connection 25 to a base station 24. The base station 24 may be connected to a network server 26 that allows communication between the mobile telephone network 11 and the Internet 28. The system 10 may include additional mobile devices and mobile devices of different types.

The mobile devices may communicate using various transmission technologies including, but not limited to, CDMA, GSM, Universal Mobile Telecommunications System (UMTS), Time Division Multiple Access (TDMA), Frequency Division Multiple Access (FDMA), WiMax, Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A mobile device involved in implementing various embodiments of the present invention may communicate using various media including, but not limited to, radio, infrared, laser, cable connection, and the like.

A mobile device can be equipped with a short-range wireless (SRW) chip set and a secure element so that it can be used for making electronic purchases, acting as a transport ticket, etc. Traditionally, the secure element (SE) is embedded internally in the mobile device. In this case, the SRW/SE communication is channeled through the mobile device operating system. Certification of the mobile device must also include certification of the embedded SE and production tests run on the mobile device circuit board can lock the secure element if the test is run more than once. A bill of material cost is accrued for the SE at the time the mobile device is manufactured. Disabling the payment function of an embedded SE can be difficult and, if software is used to disable the payment function, errors in the software can become fatal.

In one embodiment of the present invention, a secure element is incorporated into the battery of the mobile device. In this embodiment, the battery subsystem can be certified as one unit and the certification would hold for all devices that use the battery subsystem. In addition, the battery can be sold as an add-on to existing mobile devices for users who wish to upgrade their mobile device to include the ability to make electronic payments.

The secure element could be connected to a base band processor or SRW modem hardware in the mobile device. For application level communication, such a connection could be made using Single Wire Protocol (SWP) or any number of other methods such as ECMA-WI interface, Signal-In, Signal-out Connection (S2C) interface, Secure Digital Card Association (SDA) interface, On-board Credentials (ObC) interface, or a digital battery interface, or even wireless such as a Bluetooth interface, among others. Alternatively, the SRW modem could also be incorporated into the mobile device battery.

Short-range wireless (SRW) is a communication technology that operates in short distances (for example in distances below tens of centimeters). Near field communication (NFC), Radio Frequency memory tags (RF tags) and RF tag systems are all examples of SRW communication. Information may be transferred for example over RFID (radio-frequency identification) protocols. Usually, one of the parties in near field communications is a passive device, such as a card or a tag, and the other one is an active device, such as an RFID reader or mobile device with integrated RFID circuitry. Near field communication between two active devices is also possible.

A mobile device with SRW capabilities and incorporated secure element capable of holding sensitive information, such as credit card data, may act both as a passive RFID device and as an active RFID reader. There are various uses for such a mobile device. For example, users may wish to read and write information from passive RFID tags (browser shortcuts, business cards, etc.), that is, to interact with external passive devices. The secure element hosted in a mobile device may, itself, function as a passive RFID device for example for ticketing and payment applications. The mobile device may also act as an active device interacting with another active RFID device such as another mobile device in peer-to-peer type of communications. Combinations of passive and active uses in a single transaction may also be possible. For example, a secure transaction payment process may start out using the active functionality of an active RFID reader to obtain some required information and continue as a passive RFID device using the obtained data when the external device process starts. Alternatively, a secure transaction payment process could start out using the RFID device in a passive mode and after a successful passive period the RFID reader may be used in active mode to read and/or write information from/to the external device. The mobile device may even restrict the payment process so that the active period of a transaction cannot start until the passive period is successful (or vice versa).

In one embodiment of the invention, a Radio Frequency ("RF") memory tag system can be used as an alternative to RFID. In brief, certain RF memory tag systems can provide high speed data transfer from passive wireless memory tags in a few seconds with a direct radio link. These RF memory tage systems can achieve data transfer rates of twenty times that of RFID and have the additional benefit of providing non-volatile memory storage capacity such as Phase Change Memory ("PCM") or Universal Flash Store ("UFS") to name a few.

The secure element can include applications, such as a payment and/or ticketing applications. The applications may be started by a user or automatically based on the context and/or location of the mobile device. For example, when the mobile device enters within the area of a point-of-sales terminal, the secure application can start automatically. The near field communication module will be activated and subsequently a contactless payment transation can be carried out. In embodiments using RF memory tag systems, SE applications, such as payment applications can be flashable to the battery embedded RF memory tag system memory.

Power management and battery usage are typically issues facing mobile device design engineers. In addition to the typical concerns of power usage by the primary applications of a mobile device (i.e. voice, email, MMS, Web browsing, etc.), power usage by and power availability for the SRW module and SE applications must also be considered. SE applications, such as payment and/or ticketing applications, can typically operate independently from the primary applications. In the case of activation of the SRW module, the mobile device may detect a radio frequency field and, in response, pass control of establishing a near field connection to the secure module. Passing control to the secure module may mean that the mobile device simply turns on power for the secure module.

In one embodiment, the mobile device system architecture can be configured such that a battery remnant charge can be used to intermittedly power up the main chip in the mobile device with ObC in the bootloader phase to serve an incoming SRW request from the SRW radio. In this embodiment, the bootloader can sense the NFC-initiated boot and start only the Trusted Execution Environment (TrEE). No auxiliary devices, like the mobile device display, modem, or any other power consumptive elements, will need to be executed to complete the NFC-initiated transaction.

Figure 4A:
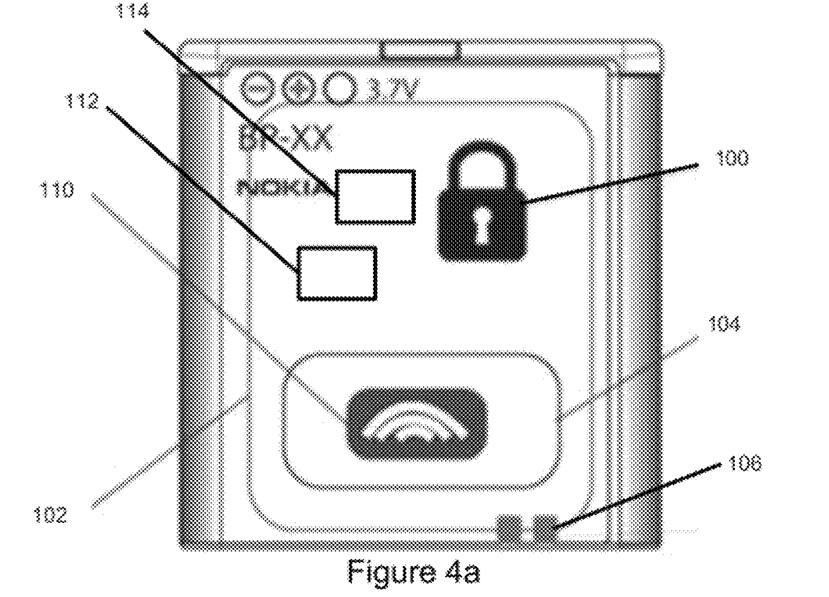
FIGS. 4a and 4b are diagrams of one embodiment for implementing various aspects of one embodiment of the invention.
Figure 4B:
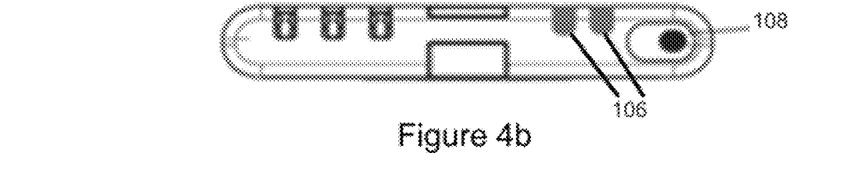

One embodiment of the invention is illustrated in FIG. 4. In this embodiment, the Secure Element 100 is incorporated into the battery 40. The SRW radio 114 (either incorporated into the mobile device 12 or the battery 40) is connected to the battery 40, for example using the Single Wire protocol (SWP) as described above. The SRW radio 114 can be externally powered, such as from an external energy field (radio frequency field) generated by, for example, a point of sales terminal. This activates the SWP toward the battery 40.

Antenna loops AL1 102 and AL2 104 can be included for communicating with an external SRW device, such as a point of sales terminal. By including an antenna (AL1 102 and/or AL2 104), the battery 40 itself can be enabled to operate as a stand alone credit card. An extra connector C2 106, can be included for connecting the antenna AL1 102 to the battery 40. Generally, antenna AL1 102 can be used when communicating with a point of sales terminal. However, if there is active amplification on the communication from the mobile device 12 back to the point of sales terminal (i.e. energy is drawn from the battery 40) a smaller antenna (e.g. AL2 104) can be used. In an alternative embodiment, antenna AL2 can be included on the back cover of the battery 40 and connected to the battery with connector C2 106. By including an antenna on the battery 40 along with the Secure Element 100, the battery 40 itself can operate as a stand-alone credit card.

An activation switch 108 can be provided for "disconnecting" the Secure Element 100, such that any secure transaction capability is disabled. A display 110, in this case in the form of a target mark, can also be included for indicating that the battery 40 is SRW capable and that the antenna AL2 104 connected. In addition, a power management module 112 can be included with the battery 40 for monitoring the battery reserve power and for managing operation of the battery 40.

Figure 5:
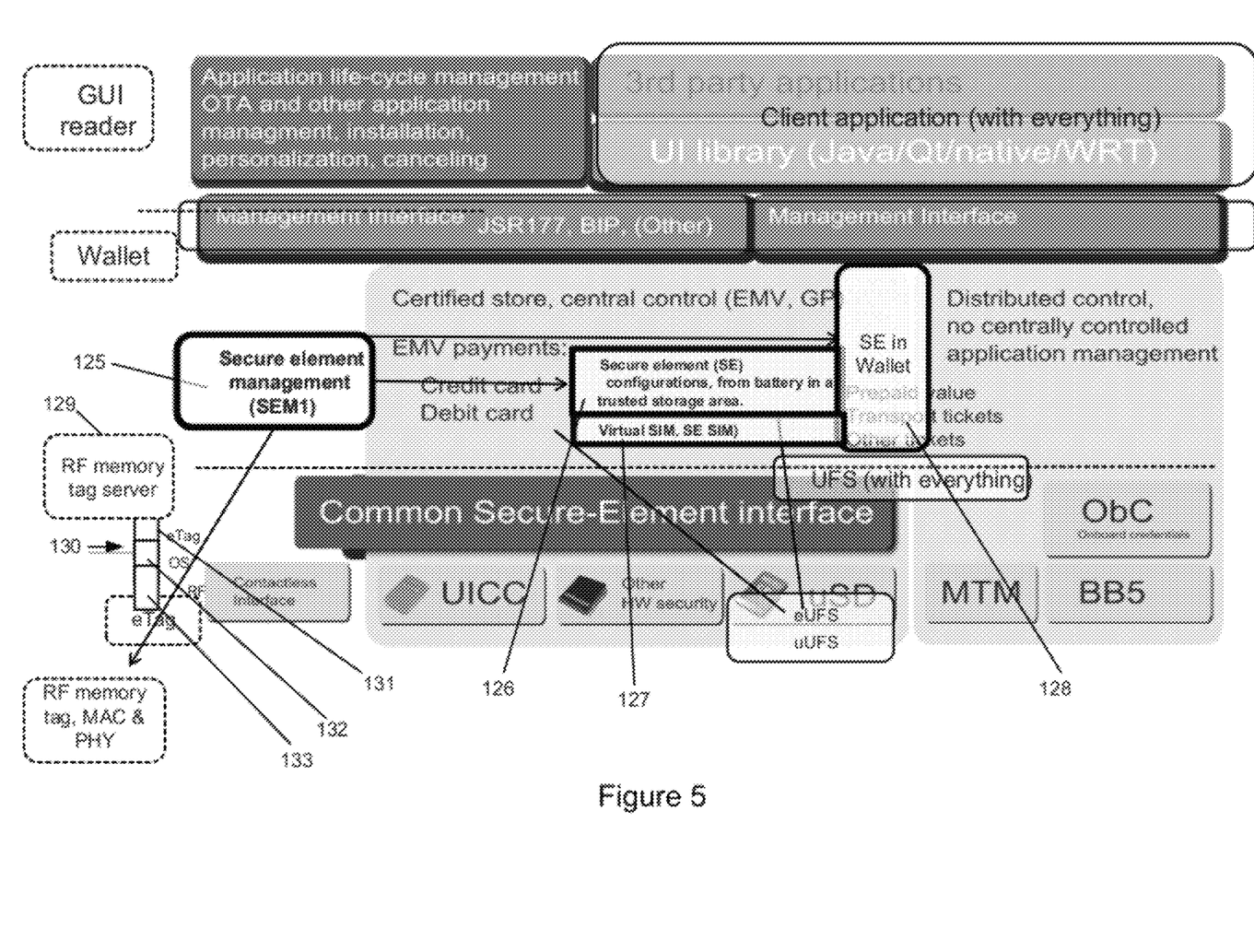
FIG. 5 is a block diagram of a RF memory tag system and secure element according to one embodiment of the invention.

FIG. 5 illustrates one example of an integrated RF memory tag system and trusted storage management elements. In this example, the secure element platform consists of a secure element management module 125 and secure elements 126, 127, and 128 located in various places. For example, there is a secure element 126 in the battery, a virtual SIM secure element 127, and a secure element 128 wallet in the mobile device. The secure element management module 125 configures and manages the secure elements 126, 127, and 128. The secure element management module 125 is configured to work with the RF memory tag server 129 to securely access and manage the trusted storage area for the secure elements 126, 127, and 128. The RF memory tag server memory 130 is divided into three parts: an eTag 131 memory part which is the device private area, an operating system memory 132 part, and an RF memory 133 part which is the public part of the memory. When a reader/writer tries to access the (active or passive) an RF memory tag, it can only read/write to the RF memory 133 part. The secure element management module 125 can also be used to verify whether to restrict access (reading or writing) to memory 130.

Figure 6:
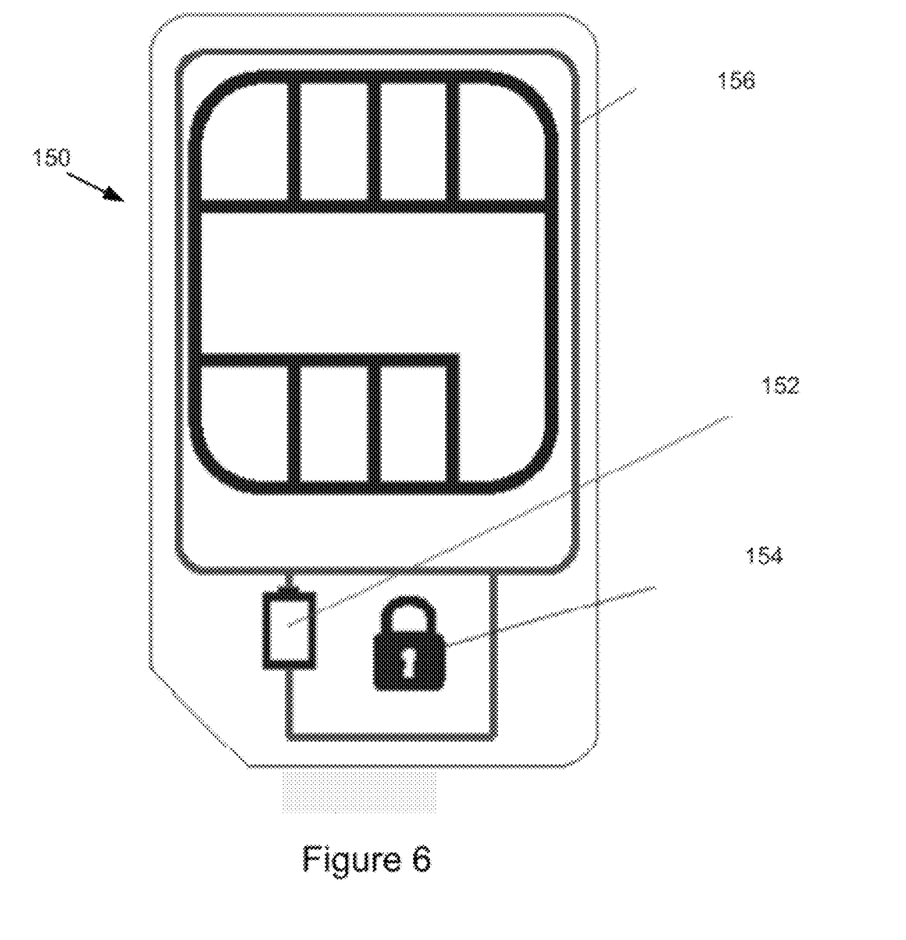
FIG. 6 is a diagram of one embodiment for implementing various aspects of one embodiment of the invention.

In another embodiment of the invention, illustrated in FIG. 6, comprises a Subscriber Identity Module (or a Universal Integrated Circuit Card "UICC" running a Universal Subscriber Identity Module "USIM" or IP Multimedia Services Identity Module "ISIM" application) commonly referred to as a SIM card configured to perform secure wireless transactions. A SIM card is a smart cart which securely stores a key identifying a mobile device service subscribers, as well as subscription information, preferences, security authentication and ciphering information, etc. The SIM card allows users to change mobile devices simply removing the card from one device and inserting it into another device. The embodiment shown in FIG. 6 includes a SIM card 150, a miniature battery 152, Secure Element 154, and antenna loop 156 can be added to a The battery 152 can be a standard size battery, a supercapacitor, or another similar miniature power source. The battery 152 can be enabled by scratching the surface or it can be operator enabled with the user SIM account is enabled. The SIM card 150 can be used as a stand-alone device or it can incorporated into a standard SIM receptacle in a mobile device.

Figure 7:
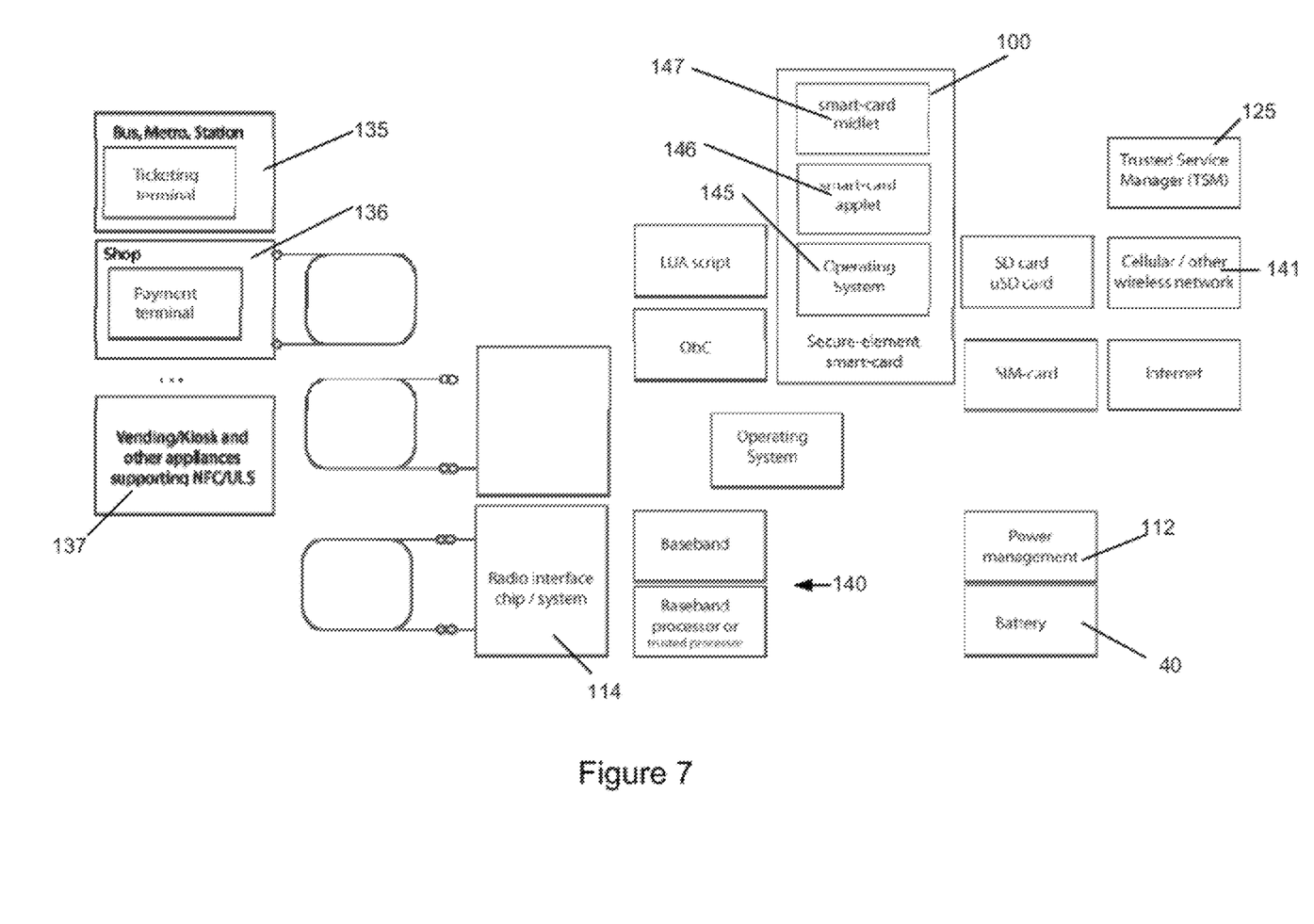
FIG. 7 is a block diagram showing secure element and RF memory tag system entities and components according to one embodiment of the invention.

FIG. 7 illustrates one embodiment of an RF memory tag system and secure element entities and components with various wireless payment/ticketing terminals. In this embodiment, the battery 40 includes a power management module 112 for monitoring and managing battery use as described above. A SRW chip set 114 is included for communicating with the wireless payment/ticketing terminals 135, 136, and 137. In this case, there is a bus/metro station ticketing terminal 135, a store payment terminal 136, and a general vending kiosk 137, all configured for wireless transactions. A baseband processing chip set 140 is included in the wireless device for communication over a typical cellular or other wireless communication network 141. A Trusted Service Manager (TSM) 125 is included for securely accesses and managing the trusted storage area for the secure element 100. Secure element 100, in the form of a smart card, includes an operating system 145, a smart-card applet, 146, and smart-card midlet 147.

Figure 8:
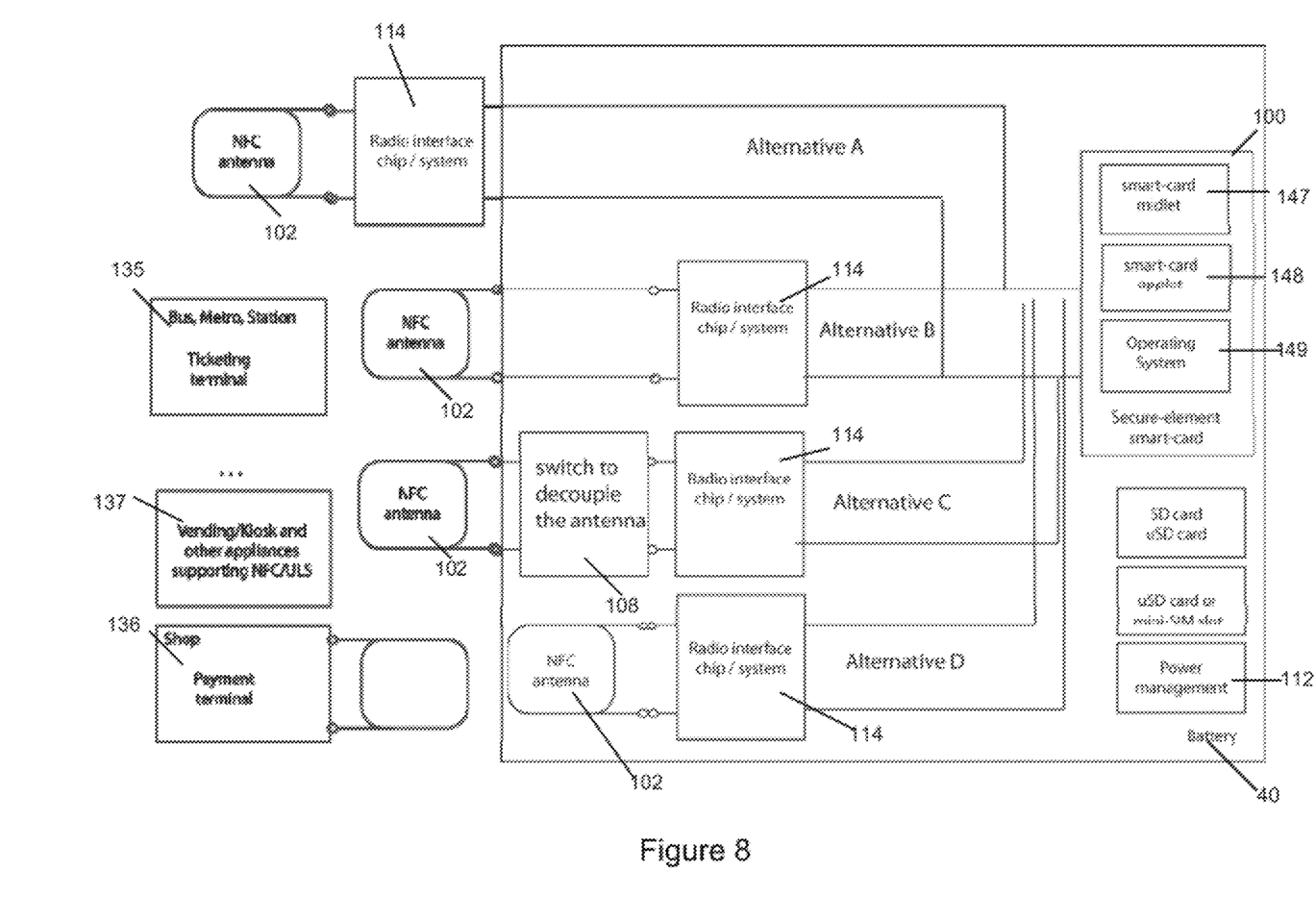
FIG. 8 is a block diagram showing secure element and RF memory tag system entities and components according to various alternative embodiments of the invention.

FIG. 8 illustrates alternative embodiments of RF memory tag systems and secure element entities and components with various wireless payment/ticketing terminals. In all of the embodiments shown in FIG. 8, the power management module 112 and the secure element 100 (in the form of a smart card), which includes the smart-card midlet 147, smart-card applet 148, and operating system 149, are all located in the battery 40. The SRW chip set 114 in each embodiment is configured for communicating with the wireless payment/ticketing terminals 135, 136, and 137. In this case, there is a bus/metro station ticketing terminal 135, a shop payment terminal 136, and a general vending kiosk 137, all configured for wireless transactions.

In Alternative A, the RF memory tag antenna 102 and SRW chip set 114 are both located in the mobile device but outside the battery 40. In Alternative B, the antenna 102 is located in the mobile device outside the battery 40, but the SRW chip set 114 is located in the battery 40. In Alternative C, a decoupling switch 108 is located inside the battery 40 for decoupling the SRW chip set 114 (located inside the battery 40) from the antenna 102 (located outside the battery 40). By activating the decoupling switch 108 and decoupling the SRW chip set from the antenna 102, the secure transaction capability of the secure element 100 is disabled. This mechanism allows the user of the mobile device to "turn off" the secure transaction capability of the mobile device to ensure that the secure transactions cannot be made without user permission. A user may want to use this feature, for example, when traveling in countries where theft and/or fraud are high. In Alternative D, the antenna 102, and SRW chip set 114 are located inside the battery 40 along with the secure element 100, essentially making the battery 40 a stand-alone credit card. As one can imagine, any number of other alternative configurations, arrangements, and/or embodiments can be made. In one mode of operation of an embodiment of the invention, the mobile device 12 can be configured to go into a low power mode when the battery 40 power reaches a predetermined minimum level. In the low power mode, the battery 40 would stop providing power to the mobile device 12 and only provide power to components necessary for the Trusted Execution Environment. Low power mode could be triggered when the battery reserve reaches the level where there is only enough battery power to keep the TrEE powered on for a predetermined amount of time (e.g. 24 hours). In one embodiment, the TrEE can comprise the secure element 100 and the SRW chip set 114. The battery 40 itself could be configured to carry out triggering the low power mode in one embodiment. In this embodiment, the power management module 110 is configured to monitor the battery reserve power and trigger the low power mode when the battery reserve power reaches a predetermined minimum threshold. In this case, there is no need for the mobile device 12 to include additional software or firmware for triggering low power mode. In this manner, low power mode Trusted Execution Environment can be supplied as an add-on feature by simply providing an upgraded battery enabled with this feature.

In another embodiment, either the battery 40 or the SRW radio can be wired to the mobile device main processor (controller 56) in such a way that the bootloader can easily sense that the boot is initiated from the SRW radio. In one embodiment, this can be accomplished in a manner similar to electrically raising an I/O port in the processor at boot. Either the battery 40 or the SRW radio can be wired to be able to boot the processor (controller 56). In one embodiment, this can be done by closing a relay in a manner similar to tripping a "power on" button. The bootloader is configured to sense the SRW initiation and to go directly into "secure element" mode without loading the mobile device operating system. In this manner, the processor (controller 56) will service the SRW protocol and immediately go back to sleep. Because no displays, modems, or other unnecessary elements are powered up, a relatively small battery charge can be used to service many SRW uses.

Figure 9:
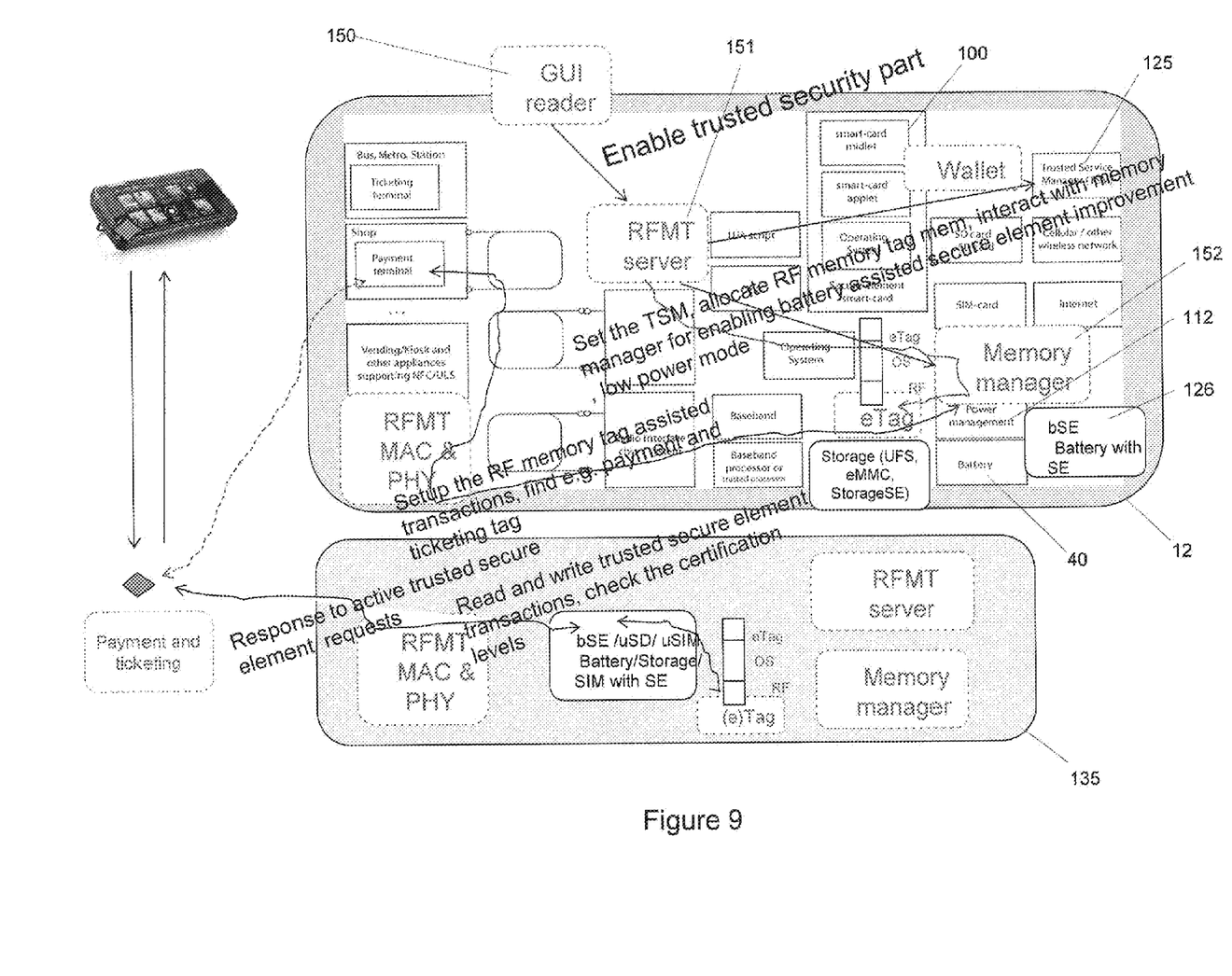
FIG. 9 is a block diagram showing information flow between the secure element and RF memory tag system entities and components according to one embodiment of the invention.

FIG. 9 illustrates information flow between the secure element and RF memory tag entities and components for one embodiment of the invention. In this embodiment, the mobile device 12, having secure elements 100, 126, a trusted service manager ("TSM") 125, a battery 40 and a power management module 112, is configured to communication with wireless payment/ticketing terminal 135. The wireless payment/ticketing terminal 135 can be an embedded tag (i.e. a tag embedded in another mobile device) or a more traditional vending machine-type external device.

When the mobile device 12 touches or comes in close proximity to the terminal 135, the mobile device 12 tries to initiate communication with the terminal 135 to process a secure wireless payment transaction. In this case, the GUI reader 150 of the mobile device 12 communicates with the RF memory tag ("RFMT") server 151 to enable the trusted security part of the mobile device 12. The RFMT server 151 sets the trusted service manager 125, allocates the RF memory tag memory, and interacts with the memory manager 152 which works with the power management module 112 to enable the low power mode described above. Next the RF memory tag assisted transactions are set up (e.g. payment and ticketing tag). In the wireless payment/ticketing terminal 135, the trusted secure element transaction read and writes is executed and the certifications levels are checked. Also, a response to the active trusted secure element requests is generated.

Figure 10:
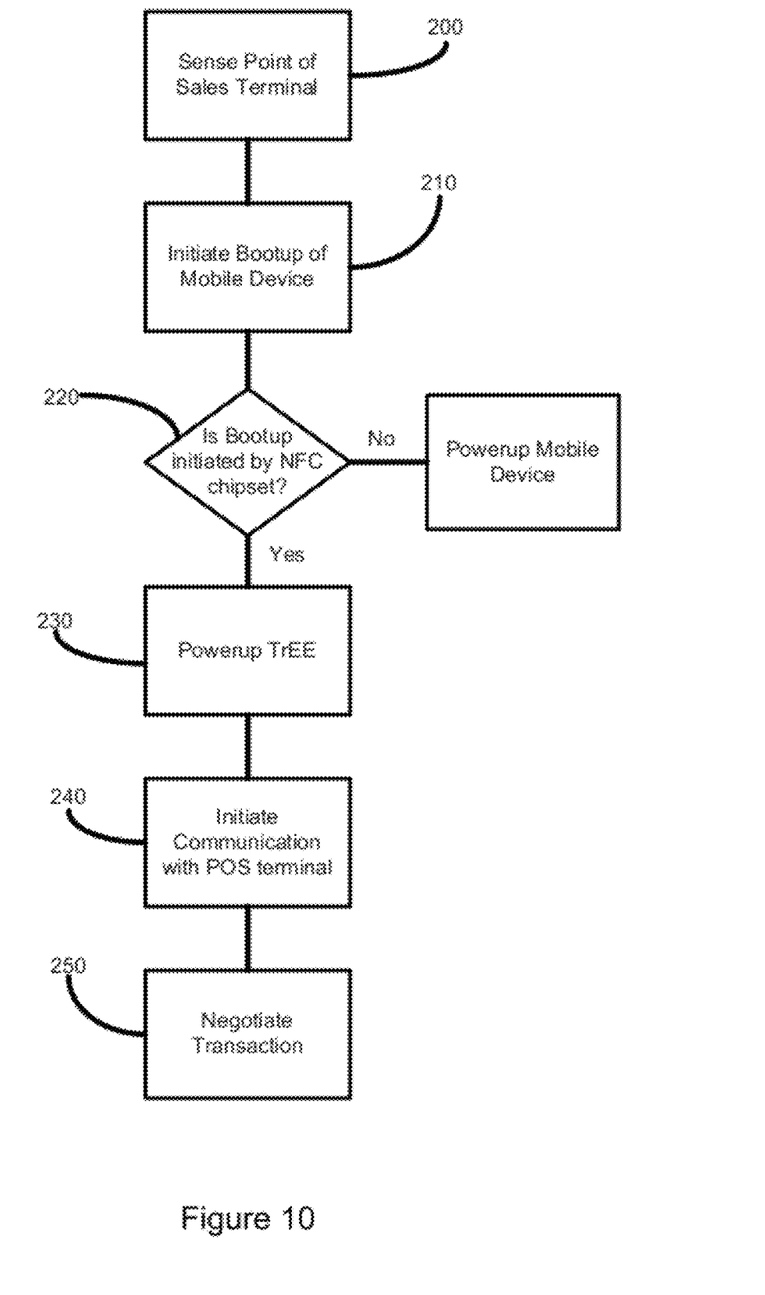
FIG. 10 is a flow chart of one embodiment of a method implementing various aspects of one embodiment of the invention.

One embodiment of a method according to the present invention is illustrated in FIG. 10. In this embodiment, the SRW chip set 114 of the mobile device 12 senses a electromagnetic field of a point of sales terminal at 200. In response, the SRW chip set 114 initiates bootup of the mobile device 12 at 210. The bootloader senses that the boot request has been initiated by the SRW chip set 114 at 220. At 230, the bootloader powers up the Trusted Execution Environment (TrEE) elements. The TrEE elements initiate communication with the point of sales terminal at 240 and, at 250, the TrEE elements and the point of sales terminal negotiate the transaction. After negotiating the transaction, the TrEE element powers down.

Figure 11:
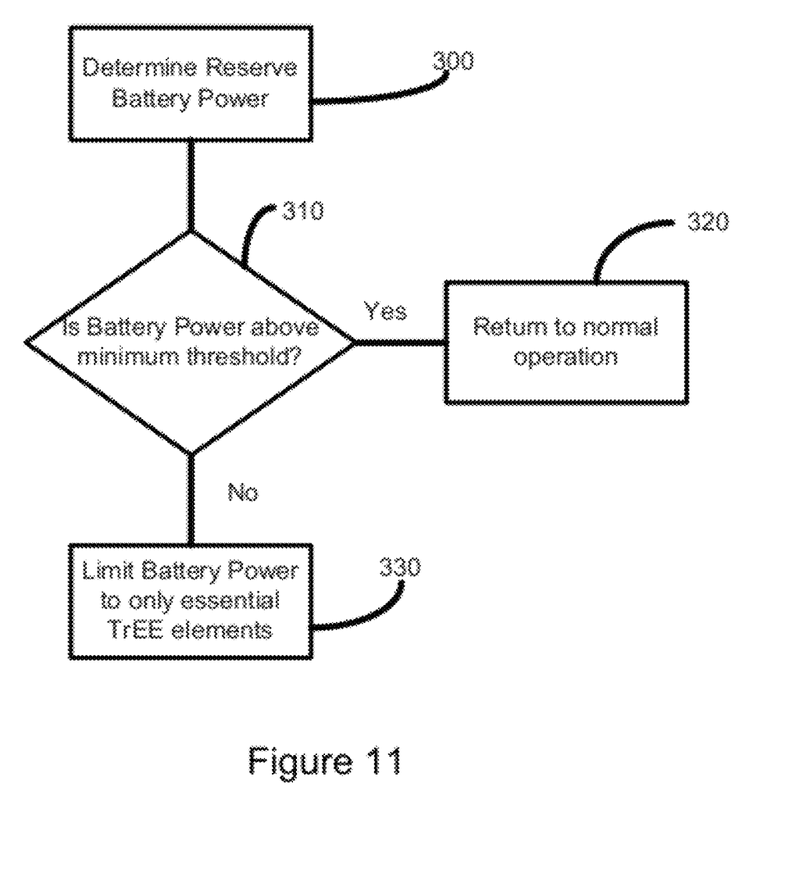
FIG. 11 is a flow chart of one embodiment of another method implementing various aspects of one embodiment of the invention.

One embodiment of another method according to the present invention is illustrated in FIG. 11. In this embodiment, the power management module 112 checks the reserve battery power at 300. At 310, the power management module 112 compares the reserve battery power to a predetermined minimum threshold. If the reserve battery power exceeds the predetermined minimum threshold, the mobile device returns to normal operation at 320. If the reserve battery power is less than the predetermined minimum threshold, the power management module 110 turn off battery power to all non-TrEE elements at 330.

Without in any way limiting the scope, interpretation, or application of the claims appearing below, a technical effect of one or more of the example embodiments disclosed herein is creating a stand alone secure transaction battery which can be incorporated into mobile devices giving the mobile device the ability to conduct secure payment transactions. Another technical effect of one or more of the example embodiments disclosed herein is providing the ability to reserve some minimum battery power for performing secure transactions by disabling power to non-essential elements of a mobile device when the battery power falls below a minimum threshold. Still another technical effect is providing the ability to sense when the mobile device is in proximity to a point of sales terminal and, in response, only providing power to Trusted Execution Environment elements essential for conducting an payment transaction without providing power to non-essential elements of the mobile device.

Embodiments of the present invention may be implemented in software, hardware, application logic or a combination of software, hardware and application logic. In an example embodiment, the application logic, software or an instruction set can be maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any nontransitory media or means that can contain or store the instructions for use by or in connection with an instruction execution system, apparatus, or device, such as a computer.

The various embodiments described herein are described in the general context of method steps or processes, which may be implemented in one embodiment by a computer program product, embodied in a non-transitory computer-readable medium, including computer-executable instructions, such as program code, executed by computers in networked environments. A non-transitory computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Additionally, the various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A mobile device, comprising:
a battery;
a short-range wireless (SRW) communication chip set;
a secure element incorporated into the battery; and
an activation switch at an outer surface of the battery, wherein the activation switch is configured to disconnect the secure element when a user physically actuates the activation switch at the outer surface of the battery;
wherein the SRW chip set is configured to sense proximity to a point of sales terminal and, in response, initiate bootup of the mobile device, and power up only the SRW chip set and the secure element.

2. The mobile device of claim 1, further comprising a power management module configured to monitor reserve battery power, wherein the power management module is configured to disable power to the mobile device and only provide power to the SRW chip set and the secure element when the reserve battery power drops below a minimum threshold.

3. The mobile device of claim 2, wherein the power management module is incorporated into the battery, wherein the activation switch is configured to be accessible to the user at the outer surface of the battery, wherein the activation switch is configured to disconnect the secure element when the user exerts a force on the activation switch, and wherein the battery is configured to be used as standalone device configured to communicate with the point of sales terminal.

4. The mobile device of claim 1, wherein the SRW chip set is incorporated into the battery.

5. The mobile device of claim 1, wherein the activation switch comprises a user actuatable manual switch at the outer surface of battery.

6. The mobile device of claim 1, further comprising a display configured to indicate whether the SRW chip set is connected.

7. The mobile device of claim 1, further comprising an antenna incorporated into the battery and connected to the SRW chip set.

8. The mobile device of claim 1, wherein the SRW chip set further comprises a power radio and a data radio.

9. The mobile device of claim 8, wherein the secure element is configured to switch between the power radio and data radio based on predetermined criteria.

10. The mobile device of claim 1, further comprising a bootloader configured to determine bootup was initiated by the SRW chip set and, in response, indicated that only the SRW chip set and secure element should be booted up.

11. A method, comprising:
sensing proximity to a point of sales terminal;
initiating bootup of a mobile device in response to sensing proximity to the point of sales terminal; and
powering up only trusted execution environment elements in the mobile device;
wherein the trusted execution environment elements comprise a short-range wireless communication chip set and a secure element, and wherein an activation switch at an outer surface of a battery of the mobile device is configured to disconnect the secure element when a user physically actuates the activation switch at the outer surface of the battery.

12. The method of claim 11, wherein a short-range wireless communication (SRW) chip set initiates bootup of the mobile device in response to sensing proximity to the point of sales terminal.

13. The method of claim 11, wherein the trusted execution environment elements negotiate a transaction with the point of sales terminal.

14. The method of claim 11, wherein the SRW chip set initiates bootup in response to sensing proximity to the point of sales terminal and wherein a bootloader determines that bootup was initiated by the SRW chip set and, in response, powers up only the trusted execution environment elements.

15. The method of claim 11, further comprising:
monitoring reserve battery power; and
disabling power to the mobile device and only providing power to the trusted execution environment elements when the reserve battery power drops below a minimum threshold.

16. A method comprising:
monitoring reserve battery power in a mobile device having trusted execution environment configured for executing secure transactions;
disabling power to the mobile device and only providing power to the trusted execution environment elements when the reserve battery power drops below a minimum threshold;
wherein the trusted execution environment element comprise a secure element incorporated into a battery in the mobile device and a short-range wireless communication (SRW) chip set, and wherein an activation switch at an outer surface of the battery is configured to disconnect the secure element when a user physically actuates the activation switch at the outer surface of the battery.

17. The method of claim 16, further comprising:
sensing proximity to a point of sales terminal;
initiating bootup of a mobile device in response to sensing proximity to the point of sales terminal; and
powering up only the trusted execution environment elements in the mobile device.

18. The method of claim 17, wherein the trusted execution environment elements negotiate a transaction with the point of sales terminal.

19. A method, comprising:
providing a battery;
providing a short-range wireless (SRW) communication chip set;
incorporating a secure element into the battery; and
providing an activation switch at an outer surface of the battery, wherein the activation switch is configured to disconnect the secure element when a user physically actuates the activation switch at the outer surface of the battery;
wherein the SRW chip set is configured to sense proximity to a point of sales terminal and, in response, initiate bootup of a mobile device, and power up only the SRW chip set and the secure element.

20. An apparatus, comprising:
at least one processor; and
at least one memory including computer program code
the at least one memory and the computer program code configured to, with the at least one processor, cause the apparatus to perform at least the following:
sense proximity to a point of sales terminal;
initiate bootup of a mobile device in response to sensing proximity to the point of sales terminal; and
power up only trusted execution environment elements in the mobile device;
wherein the trusted execution environment elements comprise a short-range wireless communication chip set and a secure element, and wherein an activation switch at an outer surface of a battery of the mobile device is configured to disconnect the secure element when a user physically actuates the activation switch at the outer surface of the battery.

21. An apparatus, comprising:
at least one processor; and
at least one memory including computer program code
the at least one memory and the computer program code configured to, with the at least one processor, cause the apparatus to perform at least the following:
monitor reserve battery power in a mobile device having trusted execution environment elements configured for executing secure transactions;
disable power to the mobile device and only providing power to the trusted execution environment elements when the reserve battery power drops below a minimum threshold;
wherein the trusted execution environment elements comprise a secure element incorporated into a battery in the mobile device and a short-range wireless communication (SRW) chip set, and wherein an activation switch at an outer surface of the battery is configured to disconnect the secure element when a user physically actuates the activation switch at the outer surface of the battery.

* * * * *